(12) United States Patent
Xu

(10) Patent No.: US 9,326,127 B2
(45) Date of Patent: Apr. 26, 2016

(54) FILE READ/WRITE METHOD AND MOBILE TERMINAL

(71) Applicant: Huawei Device Co., Ltd., Shenzhen (CN)

(72) Inventor: Jiang Xu, Shanghai (CN)

(73) Assignee: Huawei Device Co., Ltd., Shenzhen, Guangdong ( * ) Notice: Subject to any disclaimer, the term of this patent is extended or adjusted under 35 U.S.C. 154(b) by 181 days.

(21) Appl. No.: 14/145,274

(22) Filed: Dec. 31, 2013

(65) Prior Publication Data

US 2014/0120985 A1 May 1, 2014

Related U.S. Application Data

(63) Continuation of application No. PCT/CN2011/079729, filed on Sep. 16, 2011.

(51) Int. Cl.
*H04B 1/38* (2015.01)
*H04W 8/18* (2009.01)
*H04M 1/2745* (2006.01)

(52) U.S. Cl.
CPC ........ *H04W 8/183* (2013.01); *H04M 1/274516* (2013.01); *H04M 2250/14* (2013.01)

(58) Field of Classification Search
CPC . H04L 63/0853; H04L 67/306; H04L 63/083; H04L 63/168; H04L 67/04; H04W 92/02; H04W 28/22; H04W 84/18; H04W 24/00; H04W 40/28
USPC .......... 455/558, 577, 556.1, 333, 411, 575.1, 455/414.1, 419, 435.1; 370/277, 329; 726/2, 9, 17, 20; 713/150, 193; 707/609, 621, 640
See application file for complete search history.

(56) References Cited

U.S. PATENT DOCUMENTS

| 2008/0009317 | A1* | 1/2008 | Lasser et al. .... | H04M 1/274516 455/558 |
| 2008/0235520 | A1 | 9/2008 | Becker et al. | |
| 2012/0327819 | A1* | 12/2012 | Liang ................... | G06K 19/07 370/277 |

FOREIGN PATENT DOCUMENTS

| CN | 1414765 A | 4/2003 |
| CN | 101286087 A | 10/2008 |

(Continued)

OTHER PUBLICATIONS

"Smart Card Group—Smart SIM Project—Use Cases," Version 1.0, GSM Association, Official Document Sc.06, XP050431655, Oct. 1, 2008, 56 pages.

(Continued)

*Primary Examiner* — Shaima Q Aminzay
(74) *Attorney, Agent, or Firm* — Conley Rose, P.C.; Grant Rodolph; Nicholas K. Beaulieu

(57) ABSTRACT

A file read/write method includes: determining whether a file to be read/written is a large file, where the file to be read/written is a file to be written into a calling card of the mobile terminal or a file to be read from the calling card; when a determining result is yes, negotiating with the calling card a rate of reading/writing the large file, and replacing a standard rate with a high rate as a file read/write rate of the calling card; and reading the file to be read/written from the calling card or writing the file to be read/written into the calling card according to the high rate. In the present invention, the file transmission rate may be automatically modified according to the size of a file to be read/written, so as to effectively shorten time of large-file read/write performed with a calling card.

20 Claims, 4 Drawing Sheets

(56) References Cited

FOREIGN PATENT DOCUMENTS

| CN | 101478598 A | 7/2009 |
| CN | 101499124 A | 8/2009 |
| CN | 101847215 A | 9/2010 |
| CN | 101859395 A | 10/2010 |
| EP | 0317068 A2 | 10/1988 |
| EP | 1826689 A1 | 8/2007 |
| WO | 2008004225 A2 | 1/2008 |

OTHER PUBLICATIONS

Foreign Communication From A Counterpart Application, PCT Application No. PCT/CN2011/079729, English Translation of International Search Report dated Jun. 14, 2012, 3 pages.

Partial English Translation and Abstract of Chinese Patent Application No. CN101286087A, Aug. 22, 2014, 4 pages.

* cited by examiner

FILE READ/WRITE METHOD AND MOBILE TERMINAL

CROSS-REFERENCE TO RELATED APPLICATION

This application is a continuation of International Application No. PCT/CN2011/079729, filed on Sep. 16, 2011, which is incorporated herein by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of mobile communications, and in particular, to a file read/write method and a mobile terminal.

BACKGROUND

In an existing mobile terminal (such as a mobile phone), when the mobile phone is started up, a universal subscriber identity module (USIM) card performs a communication handshake, and fixes a communication rate between the mobile phone and the USIM card.

For example, in the International Organization for Standardization (ISO) 7815 standard, some definitions are made on physical characteristics of the USIM card, in which it is described that the USIM card fixes its communication rate value when startup and power-on are performed, and currently a common rate is 106 kilobits per second (Kbps). At this rate, when it is required to read/write a large file from/into the USIM card, the entire read/write time is remarkably increased.

SUMMARY

Embodiments of the present invention provide a file read/write method and a mobile terminal, which can implement rate-variable communication between a USIM card and a mobile phone, so as to increase read/write efficiency of a large file in the USIM card.

A file read/write method in an embodiment of the present invention is used in a mobile terminal, and includes: determining whether a file to be read/written is a large file, where the file to be read/written is a file to be written into a calling card of the mobile terminal or a file to be read from the calling card; when a determining result is yes, negotiating with the calling card a rate of reading/writing the large file, and replacing a standard rate with a high rate as a file read/write rate of the calling card; and reading the file to be read/written from the calling card or writing the file to be read/written into the calling card according to the high rate.

A mobile terminal in an embodiment of the present invention is connected to a calling card, and the mobile terminal further includes: a determining module configured to determine whether a file to be read/written is a large file, where the file to be read/written is a file to be written into the calling card of the mobile terminal or a file to be read from the calling card; a negotiating module configured to, when a determining result of the determining module is yes, negotiate with the calling card a rate of reading/writing the large file, and replace a standard rate with a high rate as a file read/write rate of the calling card; and a read/write module configured to read the file to be read/written from the calling card or write the file to be read/written into the calling card according to the high rate.

In the embodiments of the present invention, whether to increase a file read/write rate may be determined according to a size of a file to be read/written, and when it is determined that the file to be read/written is a large file, a file transmission rate between the mobile terminal and the calling card is automatically modified through negotiation performed with a calling card, so as to shorten read/write time of the large file.

BRIEF DESCRIPTION OF THE DRAWINGS

To illustrate the technical solutions according to embodiments of the present invention or in the prior art more clearly, accompanying drawings for describing the embodiments or the prior art are introduced briefly in the following. The accompanying drawings in the following description are only some embodiments of the present invention, and persons of ordinary skill in the art can derive other drawings from the accompanying drawings without creative efforts.

DETAILED DESCRIPTION

In embodiments of the present invention, different files to be read/written in a calling card may be distinguished, and a mobile terminal may send an instruction to the calling card to adjust the communication rate between both, so as to achieve a purpose of rapidly reading/writing a large file in a calling card.

Figure 1:
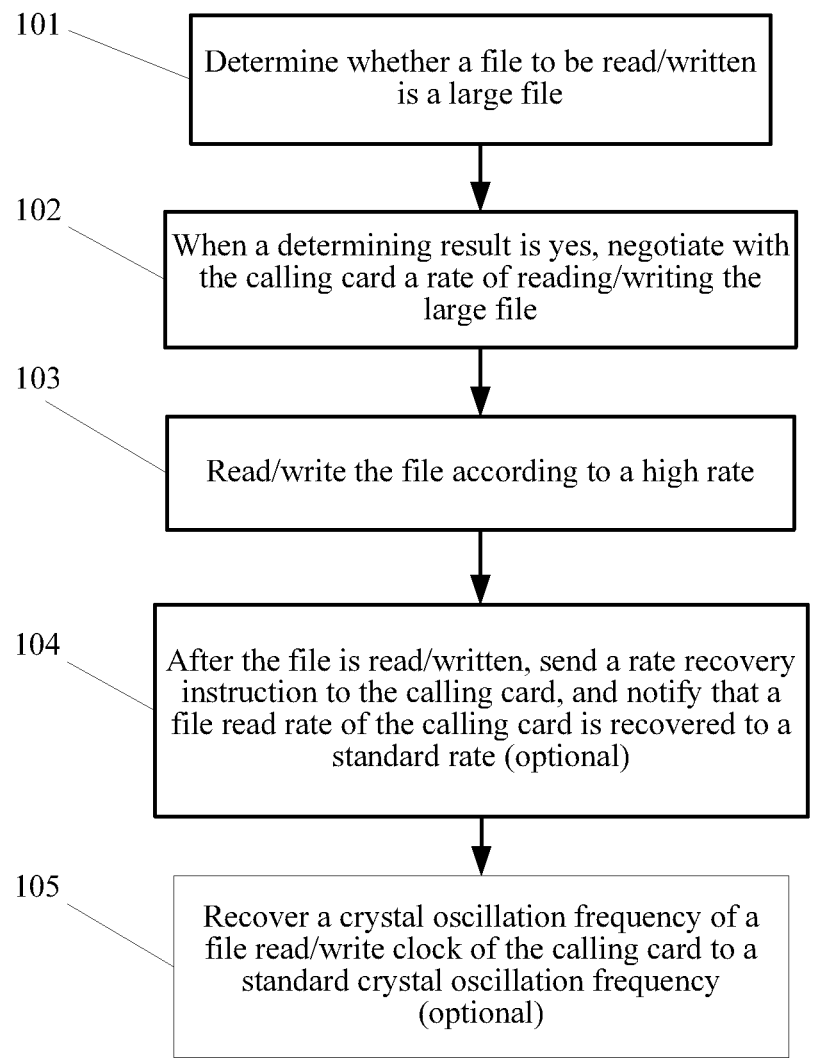
FIG. 1 is a specific schematic flowchart of a file read/write method in an embodiment of the present invention.

FIG. 1 is a specific schematic flowchart of a file read/write method in an embodiment of the present invention. The method is used in a mobile terminal, and includes the following steps.

101: Determine whether a file to be read/written is a large file, where the file to be read/written is a file to be written into a calling card of the mobile terminal or a file to be read from the calling card. The calling card described here refers to a communication calling card inserted into the mobile terminal, such as a USIM or subscriber identity module (SIM) card.

For example, when the mobile terminal is to read/write a phone book with a capacity of 1000 records in the calling card, it may be determined that the phone book file is a large file. Generally, the size and definition of a file in the calling card are usually defined through a standard document, so a type of file which is a large file may also be enumerated in advance, and a limit value for judging a file size may be set as required.

Alternatively, some types of files of the calling card are self-defined as a large file according to experiences, such as a startup read/write file, a file during phone book initialization or a file during short message initialization.

In that way, it can be understood that, this method is applicable to a startup procedure, a phone book initialization procedure or a short message initialization procedure of the mobile terminal.

102: When a determining result is yes, negotiate with the calling card a rate of reading/writing the large file, and replace a standard rate with a high rate as a file read/write rate of the calling card.

During specific negotiation, an application protocol data unit may be sent to the calling card, and the application protocol data unit carries a rate negotiation instruction and information of the high rate. When receiving the application protocol data unit, the calling card returns a reply response. If the received rate negotiation reply response returned by the calling card according to the application protocol data unit is a rate negotiation success response, it is indicated that the rate negotiation is successful, and the standard rate is replaced with the high rate as the file read/write rate of the calling card.

103: Read the file to be read/written from the calling card or write the file to be read/written into the calling card according to the high rate. A clock of the calling card is provided by the mobile terminal, so after the file read/write rate is switched to the new rate, the mobile terminal needs to adjust the clock of the calling card at the same time, so that the clock is switched to a corresponding frequency to work. This step may include: modifying a crystal oscillation frequency of a file read/write clock of the calling card from a standard crystal oscillation frequency into a high rate crystal oscillation frequency according to the high rate; and reading/writing the file according to the high rate crystal oscillation frequency.

Further, the method may further include a rate recovery process, namely, a file is read/written at the high rate only when the file is a large file, and usually a file is read/written at the standard rate, and after read/write is completed at the high rate, the rate is automatically recovered to the standard rate; the method further includes the following optional steps.

104: After file read/write is completed, send a rate recovery instruction to the calling card, and instruct the calling card to recover the file read/write rate to the standard rate.

105: Recover the crystal oscillation frequency of the file read/write clock of the calling card to the standard crystal oscillation frequency.

Figure 2:
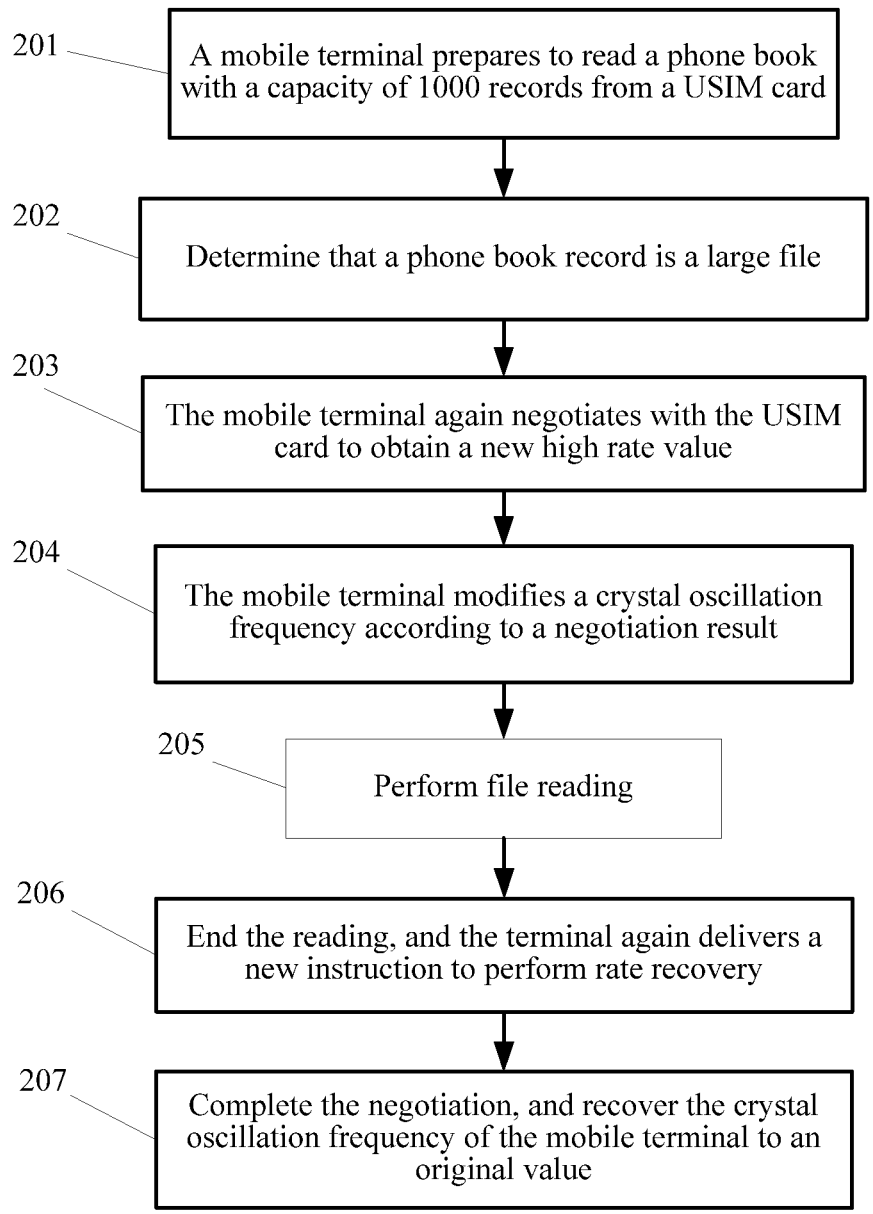
FIG. 2 is another specific schematic flowchart of a file read/write method in an embodiment of the present invention.

FIG. 2 is another specific schematic flowchart of a file read/write method in an embodiment of the present invention.

201: A mobile terminal prepares to read a phone book with a capacity of 1000 records from a USIM card.

202: Determine that the phone book record is a large file.

203: The mobile terminal again negotiates with the USIM card to obtain a new high rate value.

Namely, when the mobile terminal needs to use the new rate, the mobile terminal may send a new rate value to the card through an application protocol data unit (APDU) data packet.

A format of data in the application protocol data unit is shown in Table 1.

TABLE 1

| COMMAND | CLASS | INS | P1 | P2 | P3 |
|---|---|---|---|---|---|
| | 'A0' | 'C3' | '00' | 'rate value' | 'rate value' |

In the above table, CLASS represents a card type, whose value may be A0, 80 or 00; INS represents a command type of a current data frame, and here C3 represents a rate negotiation instruction; P1 is default; P2 and P3: a combination of P2 and P3 represents a new transmission rate value, which may be a specific value, or may also be an enumeration value.

After receiving the application protocol data unit, the USIM card performs a reply response, whose reply format may be shown in Table 2.

TABLE 2

| SW1 | SW2 |
|---|---|

A frequently-used communication reply of the USIM card is generally 2 bytes. For example, if 9000 is returned, it is indicated that a current instruction is executed successfully; on the contrary if another value is returned, it indicates an exception.

204: The mobile terminal modifies a crystal oscillation frequency according to a negotiation result. A clock of the USIM card is provided by the mobile terminal, and clock frequencies used for different communication frequencies are different, so after the file read/write rate is switched to the new rate, the mobile terminal needs to adjust a read/write clock of the USIM card at the same time, so that the read/write clock is switched to a corresponding frequency to work.

205: Perform file reading. After the read/write clock is adjusted to the new frequency, the mobile terminal may send a corresponding read instruction (during write, send a write instruction) to perform a corresponding operation on the USIM card, whose instruction format is shown in Table 3:

TABLE 3

| COMMAND | CLASS | INS | P1 | P2 | P3 |
|---|---|---|---|---|---|
| READ RECORD | 'A0' | 'B2' | Rec. No. | Mode | lgth | where the parameter P2 represents different modes, '02' represents a next record, '03' represents a previous record, '04' represents an absolute mode/current mode, and a record number is defined in P1, and represents a current record when P1='00'.

For a "next" mode and a "previous" mode, content of P1 is invalid, and is set to '00' by the mobile terminal. In order to guarantee consistency between phase 2 of the USIM card and phase 1 of the mobile terminal, the USIM card should be unable to explain a value given by the mobile terminal. A parameter with which the USIM card responds is shown in Table 4.

TABLE 4

| Byte(s) | Description | Length |
|---|---|---|
| 1-lgth | The data of the record | lgth |

206: End the reading, and the terminal again delivers a new instruction to perform rate recovery.

207: Complete the negotiation, and recover the crystal oscillation frequency of the mobile terminal to an original value.

Figure 3:
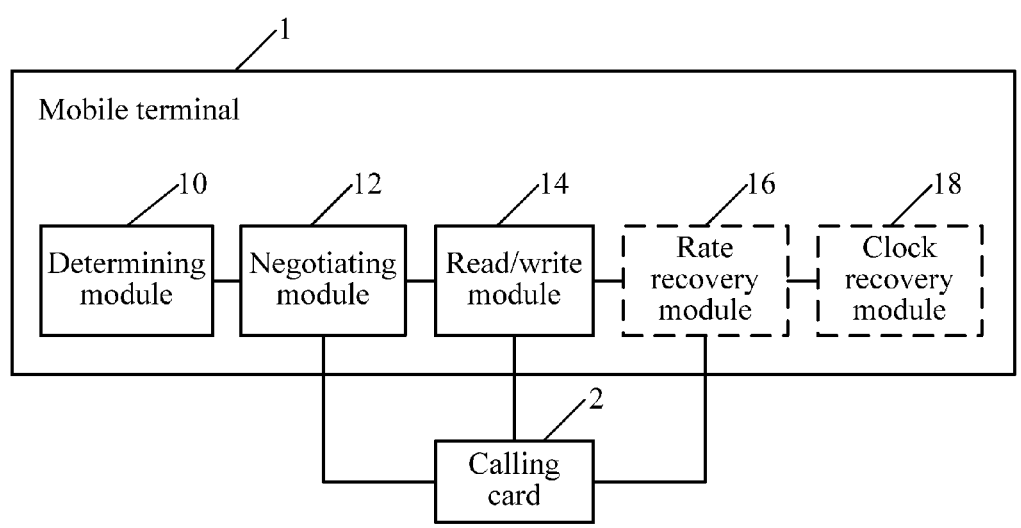
FIG. 3 is a specific schematic compositional diagram of a mobile terminal in an embodiment of the present invention.

Correspondingly, an embodiment of the present invention further provides a mobile terminal. As shown in FIG. 3, the mobile terminal 1 is connected to a calling card 2, and the mobile terminal 1 further includes: a determining module 10 configured to determine whether a file to be read/written is a large file, where the file to be read/written is a file to be written into the calling card of the mobile terminal or a file to be read from the calling card; a negotiating module 12 configured to, when a determining result of the determining module is yes, negotiate with the calling card 2 a rate of reading/writing the large file, and replace a standard rate with a high rate as a file read/write rate of the calling card 2; and a read/write module 14 configured to read the file to be read/written from the calling card 2 or write the file to be read/written into the calling card 2 according to the high rate. The large file therein may include a file obtained from the calling card 2 in a startup procedure, a phone book initialization procedure or a short message initialization procedure of the mobile terminal 1. The calling card may be a SIM or USIM card.

Further, if the mobile terminal 1 further includes a rate recovery function, the mobile terminal 1 further includes: a rate recovery module 16 configured to, after reading/writing the file, send a rate recovery instruction to the calling card 2, and instruct the calling card 2 to recover the file read/write rate to the standard rate; and a clock recovery module 18 configured to recover a crystal oscillation frequency of the file read/write clock of the calling card 2 to a standard crystal oscillation frequency. In FIG. 3, the two optional modules are indicated with dashed lines.

Figure 4:
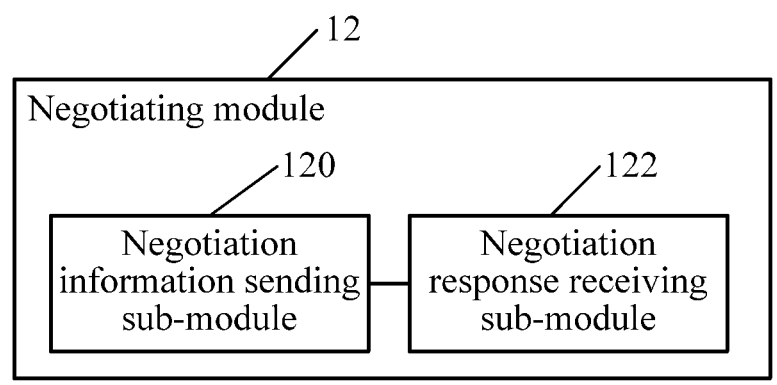
FIG. 4 is a specific schematic compositional diagram of a negotiating module in an embodiment of the present invention.

As shown in FIG. 4, the negotiating module 12 may include: a negotiation information sending sub-module 120 configured to, when the determining result of the determining module is yes, send an application protocol data unit to the calling card 2, where the application protocol data unit carries a rate negotiation instruction and information of the high rate; and a negotiation response receiving sub-module 122 configured to receive a rate negotiation response returned by the calling card 2 according to the application protocol data unit, and when the response is a rate negotiation success response, replace the standard rate with the high rate as the file read/write rate of the calling card.

Figure 5:
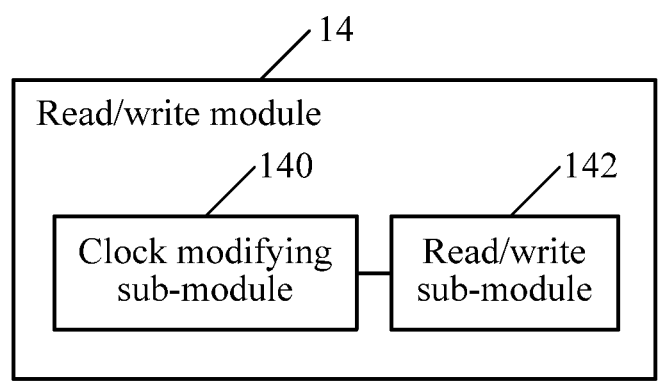
FIG. 5 is a specific schematic compositional diagram of a read/write module in an embodiment of the present invention.

As shown in FIG. 5, the read/write module 14 may include: a clock modifying sub-module 140 configured to modify a crystal oscillation frequency of the file read/write clock of the calling card 2 from a standard crystal oscillation frequency into a high rate crystal oscillation frequency according to the high rate; and a read/write sub-module 142 configured to read the file to be read/written from the calling card 2 or write the file to be read/written into the calling card 2 according to the high rate crystal oscillation frequency.

In the embodiments of the present invention, whether to increase a file read/write rate may be determined according to a size of a file to be read/written, and when it is determined that the read/write file is a large file, through negotiation performed with a calling card, and a file transmission rate is automatically modified, so as to shorten read/write time of the large file.

The above descriptions are merely exemplary embodiments of the present invention. It should be noted by persons of ordinary skill in the art that modifications and improvements may be made without departing from the principle of the present invention, which should be construed as falling within the scope of the present invention.

What is claimed is:

1. A file read/write method used in a mobile terminal, comprising:
   determining whether a file to be read/written is a large file, wherein the file to be read/written is a file to be written into a calling card of the mobile terminal or a file to be read from the calling card;
   when determining that the file to be read/written is the large file, negotiating with the calling card a rate of reading/writing the large file, and replacing a standard rate with a high rate as a file read/write rate of the calling card, wherein the rate of reading/writing the large file is negotiated by the mobile terminal sending an application protocol data unit (APDU) data packet to the calling card, wherein the APDU data packet comprises a command type of a current data frame, a rate negotiation instruction, and a new transmission rate value;
   reading the file to be read/written from the calling card or writing the file to be read/written into the calling card according to the high rate; and
   automatically recovering the standard rate when the reading or the writing according to the high rate is completed.

2. The method according to claim 1, wherein reading the file to be read/written from the calling card or writing the file to be read/written into the calling card according to the high rate, comprises:
   modifying a crystal oscillation frequency of a file read/write clock of the calling card from a standard crystal oscillation frequency into a high rate crystal oscillation frequency according to the high rate; and
   reading the file to be read/written from the calling card or writing the file to be read/written into the calling card according to the high rate crystal oscillation frequency.

3. The method according to claim 2, further comprising:
   after the file is read/written, sending a rate recovery instruction to the calling card, and instructing the calling card to recover the file read/write rate to the standard rate; and
   recovering a crystal oscillation frequency of a file read/write clock of the calling card to a standard crystal oscillation frequency.

4. The method according to claim 2, wherein the method is used in a startup procedure, a phone book initialization procedure, and a short message initialization procedure of the mobile terminal.

5. The method according to claim 1, further comprising:
   after the file is read/written, sending a rate recovery instruction to the calling card, and instructing the calling card to recover the file read/write rate to the standard rate; and
   recovering a crystal oscillation frequency of a file read/write clock of the calling card to a standard crystal oscillation frequency.

6. The method according to claim 2, wherein negotiating with the calling card the rate of reading/writing the large file, and replacing the standard rate with the high rate as the file read/write rate of the calling card, comprises receiving a rate negotiation success response returned by the calling card according to the APDU data packet, wherein the rate negotiation success response comprises two bytes.

7. The method according to claim 5, wherein negotiating with the calling card the rate of reading/writing the large file, and replacing the standard rate with the high rate as the file read/write rate of the calling card, comprises receiving a rate negotiation success response returned by the calling card according to the APDU data packet, wherein the rate negotiation success response comprises two bytes.

8. The method according to claim 5, wherein the method is used in a startup procedure, a phone book initialization procedure, and a short message initialization procedure of the mobile terminal.

9. The method according to claim 1, wherein negotiating with the calling card the rate of reading/writing the large file, and replacing the standard rate with the high rate as the file read/write rate of the calling card, comprises receiving a rate negotiation success response returned by the calling card according to the APDU data packet, wherein the rate negotiation success response comprises two bytes.

10. The method according to claim 9, wherein the method is used in a startup procedure, a phone book initialization procedure, and a short message initialization procedure of the mobile terminal.

11. The method according to claim 1, wherein the method is used in a startup procedure, a phone book initialization procedure, and a short message initialization procedure of the mobile terminal.

12. The method according to claim 1, wherein the calling card is a universal subscriber identity module (USIM) or subscriber identity module (SIM).

13. A mobile terminal connected to a calling card, comprising:
a computer processor configured to:
determine whether a file to be read/written is a large file, wherein the file to be read/written is a file to be written into the calling card or a file to be read from the calling card;
when a determining result is that the file to be read/written is the large file, negotiate with the calling card a rate of reading/writing the large file, and replace a standard rate with a high rate as a file read/write rate of the calling card, wherein the rate of reading/writing the large file is negotiated by the mobile terminal sending an application protocol data unit (APDU) data packet to the calling card, wherein the APDU data packet comprises a command type of a current data frame, a rate negotiation instruction, and a new transmission rate value;
read the file to be read/written from the calling card or write the file to be read/written into the calling card according to the high rate; and
automatically recover the standard rate when the reading or the writing according to the high rate is completed.

14. The mobile terminal according to claim 13, wherein the computer processor is configured to:
modify a crystal oscillation frequency of a file read/write clock of the calling card from a standard crystal oscillation frequency into a high rate crystal oscillation frequency according to the high rate; and
read the file to be read/written from the calling card or write the file to be read/written into the calling card according to the high rate crystal oscillation frequency.

15. The mobile terminal according to claim 14, wherein the computer processor is configured to:
after reading/writing the file, send a rate recovery instruction to the calling card, and instruct the calling card to recover the file read/write rate to the standard rate; and
recover a crystal oscillation frequency of a file read/write clock of the calling card to a standard crystal oscillation frequency.

16. The mobile terminal according to claim 14, wherein the computer processor is configured to receive a rate negotiation response returned by the calling card, and when the response is a rate negotiation success response, replace the standard rate with the high rate as the file read/write rate of the calling card, wherein the rate negotiation success response comprises two bytes.

17. The mobile terminal according to claim 13, wherein the computer processor is configured to:
after reading/writing the file, send a rate recovery instruction to the calling card, and instruct the calling card to recover the file read/write rate to the standard rate; and
recover a crystal oscillation frequency of a file read/write clock of the calling card to a standard crystal oscillation frequency.

18. The mobile terminal according to claim 17, wherein the computer processor is configured to receive a rate negotiation response returned by the calling card, and when the response is a rate negotiation success response, replace the standard rate with the high rate as the file read/write rate of the calling card, wherein the rate negotiation success response comprises two bytes.

19. The mobile terminal according to claim 13, wherein the computer processor is configured to receive a rate negotiation response returned by the calling card, and when the response is a rate negotiation success response, replace the standard rate with the high rate as the file read/write rate of the calling card, wherein the rate negotiation success response comprises two bytes.

20. The mobile terminal according to claim 13, wherein the calling card is a subscriber identity module (SIM) or universal subscriber identity module (USIM).

* * * * *